United States Patent [19]

Kamentser

[11] Patent Number: 4,718,283
[45] Date of Patent: Jan. 12, 1988

[54] VORTEX METER BODY

[75] Inventor: Boris A. Kamentser, Fountain Valley, Calif.

[73] Assignee: ITT Corporation, New York, N.Y.

[21] Appl. No.: 8,982

[22] Filed: Jan. 30, 1987

[51] Int. Cl.$^4$ .............................................. G01F 1/32
[52] U.S. Cl. ................................................... 73/861.22
[58] Field of Search ....................... 73/861.22, 861.24; 138/94, 94.3, 173

[56] References Cited

U.S. PATENT DOCUMENTS

| | | | |
|---|---|---|---|
| 2,214,959 | 9/1940 | Hamer | 138/94.3 |
| 2,354,967 | 8/1944 | Perry | 138/94.3 |
| 3,688,803 | 9/1972 | Pavia | 138/173 |
| 4,088,020 | 5/1978 | Sgourakes et al. | 73/861.24 |
| 4,362,061 | 12/1982 | Yokogawa et al. | 73/861.24 |

FOREIGN PATENT DOCUMENTS 0161967 12/1979 Japan ............................... 73/861.24

*Primary Examiner*—Herbert Goldstein
*Attorney, Agent, or Firm*—Menotti J. Lombardi

[57] ABSTRACT

A one-piece unitary vortex meter body including an outer housing portion having a conduit formed therein with an inner diametrically extending generally wedge-shaped bluff body portion formed in one piece, the housing portion being formed as a relatively thin-walled tubular sleeve with first and second enlarged flange portions at opposite ends thereof, with a pair of first and second diametrically opposed and aligned integrally formed reinforcing ribs extending radially outwardly from the outer surface of the tubular sleeve and extending between the inner facing surfaces of the flange portions. On a perpendicular diameter, there is provided a thicker radially extending reinforcing rib and a relatively large diameter columnar protrusion extending radially beyond the periphery of the flange portions, the protrusion and bluff body having formed therein a receptacle for receiving therein a sensor assembly.

3 Claims, 7 Drawing Figures

VORTEX METER BODY

BACKGROUND OF THE INVENTION

The background of the invention will be discussed in two parts.

1. Field of the Invention

This invention relates to vortex flow meters, and more particularly to an improved one-piece vortex flowmeter sensor body.

2. Description of the Prior Art

Vortex meters of current design use the localized fluid pressure fluctuations associated with the vortices produced by the bluff body to detect the vortex shedding frequency. The methods used to sense these pressures vary, but most use either a sealed, fluid-filled diaphragm-type differential pressure sensor, or use strain gages or force sensors to detect the forces caused by these pressures in some element of the bluff body.

In such prior art meters, the flowmeter body is formed in two parts, one part being the meter housing for attachment to fittings in a flow line, with the other part being the bluff body. To receive the bluff body, the housing is drilled with a through hole extending through opposing surfaces thereof, with the holes appropriately machined to accommodate the bluff body in a precise fitting relationship. Retention of the bluff body at one end generally requires a plug member. Upon insertion of the bluff body, to provide sealing, O-rings and the like are employed. Such sealing means are subject to failure.

With the two piece arrangement, the bluff body must be precisely oriented relative to the fluid flow to provide the proper vortex creation and hence precise readings from the sensor to be incorporated therein. Bluff bodies may take the form of a wedge-shaped member with a transversely extending slot and an axial opening for insertion of a sensor with the vane bisecting the dimesion within the slot. Differential pressure then results in flexing of the vane which is then converted to an electrical signal. Thus, the bluff body must be oriented on a true diameter of the conduit within the meter housing, with the wedge shaped leading end positioned in the direction of the axis of the tubular conduit. Furthermore, with the two piece arrangement, due to the discrete boundaries at the junctions of the bluff body within the conduit, hydraulic noise occurs, which noise is reflected in decreased sensitivity of the flowmeter. Such construction is very expensive, given the various parameters under consideration.

In accordance with an aspect of the present invention, it is an object to provide a new and improved one-piece vortex meter body which incorporates the bluff body within the meter housing.

SUMMARY OF THE INVENTION

The foregoing and other objects are accomplished by providing a one-piece unitary vortex meter body including an outer housing portion having a conduit formed therein with an inner diametrically extending generally wedge-shaped bluff body portion formed in one piece, the housing portion being formed as a relatively thin-walled tubular sleeve with first and second enlarged diameter generally identically dimensioned flange portions at opposite ends thereof, with a pair of first and second diametrically opposed and aligned integrally formed reinforcing ribs extending radially outwardly from the outer surface of the tubular sleeve and extending between the inner facing surfaces of the flange portions. On a perpendicular diameter, there is provided a thicker radially extending reinforcing rib and a relatively large diameter columnar protrusion extending radially beyond the periphery of the flange portions, the protrusion and bluff body having formed therein a receptacle for receiving a sensor with the vane portion extending into the slot of the bluff body.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
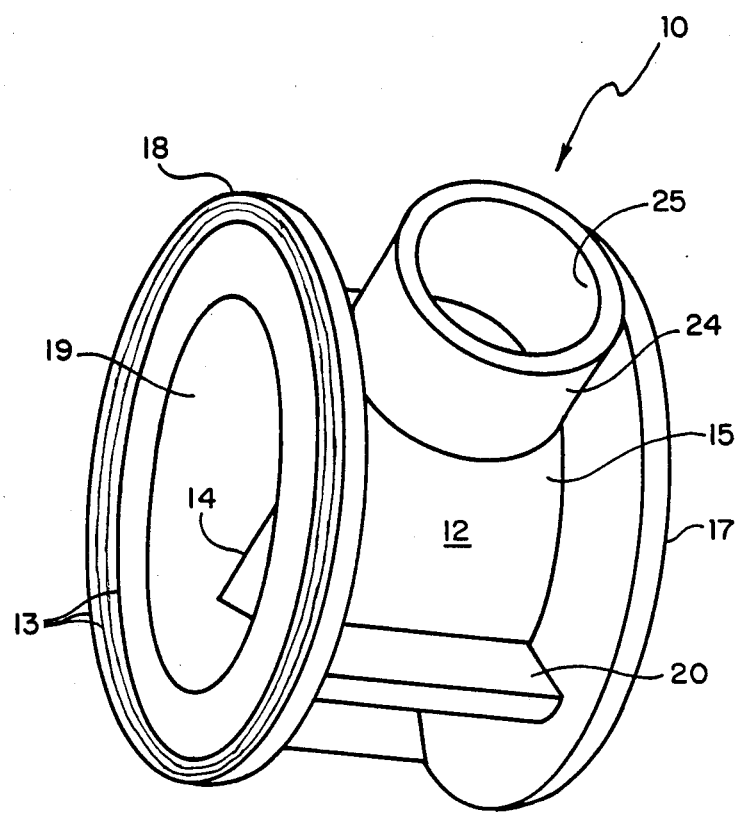
FIG. 1 is a perspective view of the one-piece vortex meter body in accordance with the invention.
Figure 2:
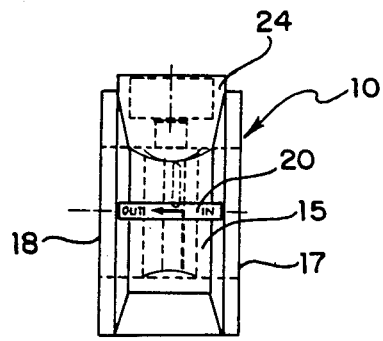
FIG. 2 is a side view of the vortex meter body of FIG. 1.

Referring now to the drawings, and particularly to FIG. 1, there is shown a vortex meter body, generally designated 10, which includes, in a one-piece unitary configuration, an outer housing portion 12 and an inner bluff body portion 14. The meter body 10 is formed of metal, such as 316 stainless steel, which is formed, such as by investment casting in one piece. Referring also to FIGS. 2 through 7, the housing portion 12 is provided with a central tubular conduit portion 15 in the form of a relatively thin-walled tubular sleeve with first and second enlarged diameter generally identically dimensioned flange portions 17 and 18 formed integrally therewith for connection to a fluid flow pipeline. The outer connecting surfaces of the flange portion 20 and 21 are generally planar and parallel to one another, with a portion of the surface having a plurality of concentric circumferential serrations or grooves 13 which engage suitable packing material between the flanges and other pipe fittings in the flow line. The conduit portion 12 has a generally centrally disposed fluid flow opening 19 of generally circular cross-section, with the fluid flow being directed in the direction of the axis of the conduit 12.

First and second diametrically opposed and aligned integrally formed webs or reinforcing ribs 20 and 21 (See FIG. 3) extending radially outwardly from the outer surface of the conduit portion 12 and extending between the inner facing surfaces of the flange portions 20 and 21. On another diameter perpendicular to the diameter including the ribs 20 and 21, there is provided a thicker radially extending reinforcing rib 22 and a relatively large diameter columnar protrusion 24 extending radially beyond the periphery of the flange portions 20 and 21, the axial centerline of the protrusion 24 lying on the diameter which extends through the center of rib 22.

Figure 3:
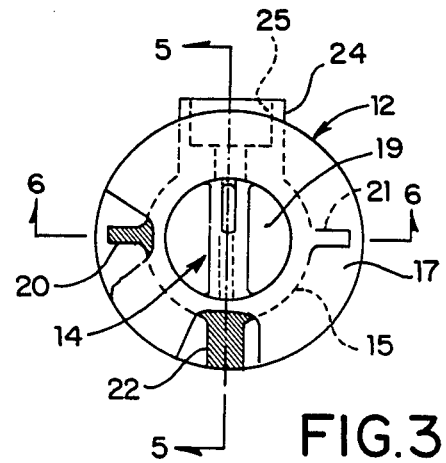
FIG. 3 is a front elevational view of the vortex meter body of FIG. 1.
Figure 4:
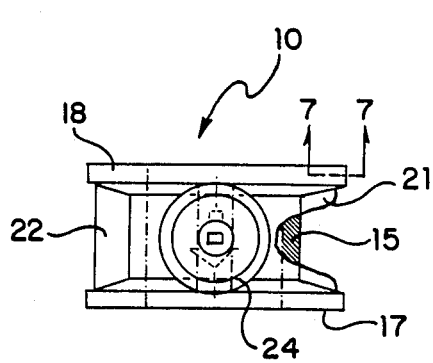
FIG. 4 is a top plan view of the vortex meter body of FIG. 1, partially broken away and in cross-section.
Figure 5:
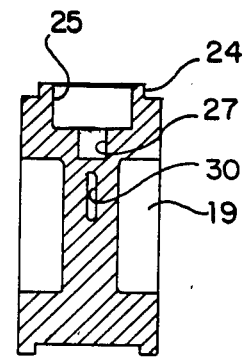
FIG. 5 is a cross-sectional view of the vortex meter body of FIG. 3, as viewed generally along line 5—5 thereof.
Figure 6:
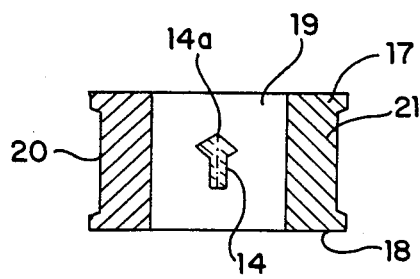
FIG. 6 is a cross-sectional view of the vortex meter body of FIG. 3, as viewed generally along line 6—6 thereof.
Figure 7:
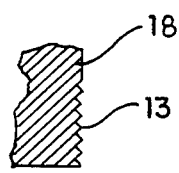
FIG. 7 is an enlarged partial cross-sectional view of the vortex meter body of FIG. 7 as viewed generally along line 7—7 thereof.

As shown in FIGS. 3 and 5, integrally formed with the meter body 12 is the bluff body 14 which has the longitudinal centerline thereof extending along the same diameter which includes the rib 22 and the protrusion 24. The bluff body 14, in cross-section, is generally wedge-shaped (See FIG. 6), with the tip or leading edge 14a of the bluff body 14 facing in the direction of oncoming fluid flow. As shown in FIG. 6, the bluff body is generally centrally positioned between the inlet and outlet flange portions 17 and 18, with the bluff body 14 being symmetrically arranged relative to the axial centerline of the conduit portion 15. To promote smooth flow of fluid, interior corners at the junction of the bluff body with the inner walls of the conduit portion are rounded (See FIG. 4). With two piece arrangements, sharp or erratic surfaces would be encountered by the fluid flow at the junction of the bluff body with the inner walls, thus introducing noise into the vortex production at these junctures.

As shown in FIGS. 1 through 5, the protrusion 24 is provided with a concentrically positioned recess of circular cross-section to form an upper chamber 25, which communicates with a contiguous coaxial smaller diameter opening 27, which again, in turn communicates with a transversely extending slot 30. The slot 30 extends completely through the bluff body 14 in a direction transverse to the longitudinal centerline thereof and in a direction transverse to the axial centerline of the conduit portion 15. The contiguous chamber, opening and slot are configured for receiving therein a vortex meter sensor assembly. Reference may be had to the aforementioned cross-referenced patent application for further details concerning the sensor assembly for insertion into the bluff body/slot configuration.

In accordance with the present invention, there is provided a unitary vortex flow meter body 10 in which the housing 12 and bluff body 14 along with the slot 30 and the necessary openings for receiving the sensor assembly are provided as an integrated structurally rigid unit, of relatively thin walled construction with reinforcing or stiffening ribs, thus eliminating problems of sealing, orientation of the bluff body, and more importantly providing an economical, reliable unit. With the unitary assembly, any noise within the meter sensing arrangement, such as hydraulic noise associated with fluid flow at sharp corners or irregular surfaces. While there has been shown and described preferred embodiment, it is to be understood that various other adaptations and modifications may be made within the spirit and scope of the invention.

What is claimed is:

1. A one-piece unitary vortex meter body comprising:
   (a) an outer housing portion formed as a relatively thin-walled tubular sleeve for forming a conduit therein and with first and second enlarged diameter generally identically dimensioned flange portions at opposite end of said sleeve;
   (b) reinforcing rib means extending outwardly from the outer surface of said tubular sleeve and extending between the inner facing surfaces of said flange portions;
   (c) bluff body means extending diametrically across the interior walls of said tubular sleeve;
   (d) a relatively large diameter columnar protrusion extending from the outer wall of said tubular sleeve on a radial line and terminating beyond the periphery of said flange portions;
   (e) receptacle means formed in said protrusion and at least partially in said bluff body means for receiving a vortex sensor assembly;
   (f) said bluff body means includes slot means extending therethrough with the long dimension of said slot means being on the longitudinal centerline thereof, said slot means being configured for receiving a vane portion of the sensor assembly;
   (g) said rib means includes a pair of diametrically opposed aligned rib portions, and another radially extending rib generally perpendicular to said aligned ribs; and
   (h) said protrusion has the centerline thereof on the diameter of said another radially extending rib.

2. In combination, a vortex meter body comprising:
   (a) an outer housing portion formed as a relatively thin-walled tubular sleeve for forming a conduit therein and with first and second enlarged diameter generally identically dimensioned flange portions at opposite end thereof;
   (b) a pair of first and second diametrically opposed and aligned reinforcing ribs extending radially outwardly from the outer surface of the tubular sleeve and extending between the inner facing surfaces of the flange portions;
   (c) another reinforcing rib extending radially outwardly from the outer surface of said tubular sleeve and extending betwen the inner facing surfaces of said flange portions on a diameter generally perpendicular to the diameter through said pair of ribs;
   (d) a columnar protrusion extending radially from the outer surface of said tubular sleeve beyond the periphery of said flange portions;
   (e) a bluff body portion of generally wedge-shaped cross-section extending diametrically across said conduit, the protrusion and bluff body having collectively formed therein receptacle means for receiving vortex sensing means;
   (f) said protrusion has the centerline thereof on the diameter of said another radially extending rib;
   (g) said bluff body portion includes slot means extending therethrough with the long dimension of said slot means being on the longitudinal centerline thereof, said slot means being configured for receiving a vane portion of the vortex sensing means; and
   (h) said flange portions having outer connecting surfaces which are generally planar and parallel to one another, and said outer connecting surfaces having a plurality of concentric circumferential grooves.

3. The combination of claim 2, wherein said vortex meter body is stainless steel formed by investment casting.

* * * * *